Nov. 14, 1967     F. SCHACHTER     3,352,622
BALLPOINT PENS

Filed Sept. 29, 1964     2 Sheets-Sheet 1

INVENTOR
FRIEDRICH SCHACHTER
BY Munson H. Lane
ATTORNEY

Nov. 14, 1967    F. SCHACHTER    3,352,622
BALLPOINT PENS
Filed Sept. 29, 1964    2 Sheets-Sheet 2

INVENTOR
FRIEDRICH SCHACHTER
BY Munson H. Lane
ATTORNEY

United States Patent Office 3,352,622
Patented Nov. 14, 1967

3,352,622
BALLPOINT PENS
Friedrich Schachter, 6333 W. Harrison St.,
Forest Park, Ill. 60130
Filed Sept. 29, 1964, Ser. No. 400,107
8 Claims. (Cl. 401—141)

ABSTRACT OF THE DISCLOSURE

This invention relates to new and useful improvements in ballpoint pens, and in particular, the invention concerns itself with stopper means for preventing back leakage of ink from the ink reservoir of such pens.

---

The present application is a continuation-in-part of my application Serial No. 366,583, filed May 11, 1964, now abandoned.

The conventional ink reservoir, communicating at one end thereof with the usual ballpoint writing tip, is open at its other end to the atmosphere so that air may enter the reservoir to displace the ink used in writing. While ordinarily the meniscus of the ink column or a follower prevents the ink from flowing back through the open end of the reservoir, it does so on occasions when the pen is exposed to vibration or is violently jarred or when a break occurs in the ink film surrounding the ballpoint, which permits air to enter the reservoir from the ballpoint end with a resultant leakage of ink through the open back end of the reservoir. Frequently the ink causes the outside of the ballpoint pen to become soiled.

In an effort to prevent such back leakage of ink, stoppers of porous materials, either sintered or foamed, have been placed behind and separated by an air space from the normal level of the fluid, on the theory that such conventional stoppers would facilitate ingress of atmospheric air while preventing backflow of ink beyond the stopper when the ink upon reaching the stopper fills up the pores of the stopper and further seeping of the ink is arrested by capillary action or through swelling.

However, with mass production by which ballpoint pens are usually manufactured, the conventional stoppers frequently do not attain the practical result which they are intended to provide, since in many instances the ink backflows past the stopper. Also, in some instances the conventional stoppers impair the flow of air into the reservoir so that ink in the reservoir does not flow properly to the writing point. In situations of backflow past the stopper, the cause lies largely in the fact that the pores of the stopper are too large or that spaces exist by improper fit of the stopper in the surrounding wall. On the other hand, in instances of insufficient ingress of air to produce proper writing action, the pores of the stopper are too small, either in the stopper material itself as initially formed, or as a result of its compression during installation in the reservoir which causes the pores to become restricted. The ink solvent vapors saturating the air space between the stopper and the fluid may cause swelling and closing of the pores of stoppers made from foam material.

The invention overcomes the disadvantages of conventional stoppers as above outlined, this being attained, as one feature, by providing a stopper of material which is soaked, impregnated, coated or otherwise treated with an ink-repelling substance, so that if the ink in the reservoir flows back to the stopper, the ink-repelling substance prevents the ink from passing through the stopper pores.

As another feature, the invention provides a stopper made of hairy or fibrous material so that when the stopper is fitted in the ink reservoir and is incidentally creased or wrinkled during such fitting to an extent that the creases or wrinkles create spaces between the stopper and the wall retaining it, the hairs or fibers of the material automatically fill up such spaces and prevent backflow of ink therethrough.

In conjunction with the aforementioned features, the invention facilitates use of stopper materials such as blotting paper, felt, wick, filter paper, and the like, which ordinarily possess absorbent properties but which are made ink-repellant by their treatment with the ink-repelling substance so that they are well suited for purposes of the invention, particularly in view of their hairy or fibrous consistency.

The invention provides stopper means arranged either inside a separate ink cartridge for use in a ballpoint pen, or inside a ballpoint pen, said pen being directly filled or holding a separate cartridge alternatively.

The stopper of the invention is separate and spaced away from the ink supply in the reservoir so that an air space exists between the stopper and the level of ink, such space being in communication with the atmosphere through the pores of the stopper material.

Also, the invention contemplates a stopper arrangement wherein one or two or more stoppers are used in series, such stoppers being either of a flat disc type, or of a cup shape, or a combination of both, so that even if for some reason the ink backflows beyond the innermost stopper, it becomes positively arrested by the subsequent, outer ones.

With the foregoing more important features in view and such other features as may become apparent as this specification proceeds, the invention will be understood from the following description taken in conjunction with the accompanying drawings, wherein like characters of reference are used to designate like parts, and wherein.

Figure 1:
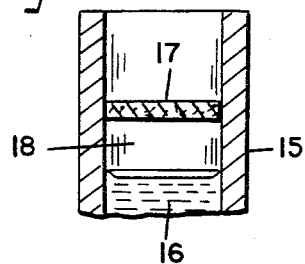
FIGURE 1 is a fragmentary sectional view of a ballpoint pen ink cartridge with a disc type stopper of the invention.

Referring now to the accompanying drawings in detail, more particularly to FIG. 1, the reference numeral 15 designates the back end portion of an ink cartridge for use in a ballpoint pen, the ink supply being indicated at 16. The back end of the cartridge is open to communicate with the atmosphere, but a porous stopper 17 is inserted therein to prevent back flow of ink while permitting ingress of air to displace outgoing ink at the writing point.

Figure 2:
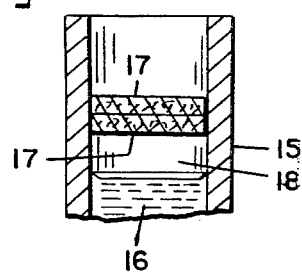
FIGURE 2 is a fragmentary sectional view of the same with two disc type stoppers.

The stopper 17 is in the form of a flat disc which is fitted into the open, back end portion of the cartridge as shown in FIG. 1. Two or more such stoppers may be used in series as exemplified in FIG. 2, and when several stoppers are used, they may abut one another as shown or they may be spaced from each other to some extent. In any event, it will be observed that an air space 18 exists between the stopper or stoppers and the level of the ink 16, such space communicating with the atmosphere through the porous material from which the stopper means are formed.

Figure 3:
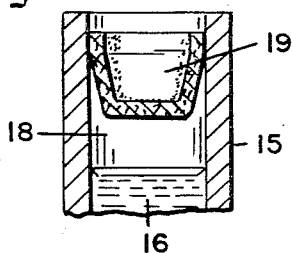
FIGURE 3 is a fragmentary sectional view with a cup-shaped stopper.
Figure 4:
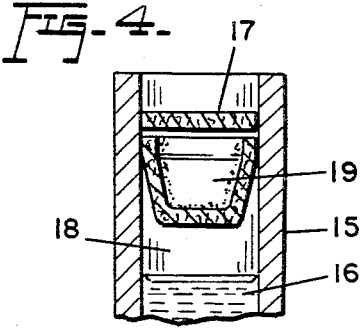
FIGURE 4 is a fragmentary sectional view with a disc type and a cup-shaped stopper means.
Figure 5:
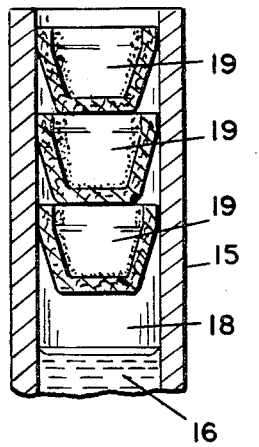
FIGURE 5 is a fragmentary sectional view with a plurality of cup-shaped stoppers.
Figure 6:
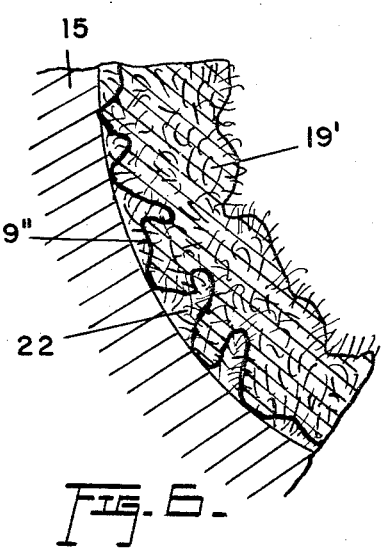
FIGURE 6 is a much enlarged, fragmentary cross-sectional detail showing a marginal edge portion of a stopper against the wall retaining it.

FIG. 3 illustrates a stopper 19 which is cup-shaped and has its rim portion 19' in contact with the inner wall of the cartridge 15. FIG. 4 shows stopper means comprising a series arrangement of an inner, cup-shaped stopper 19 and an outer, disc stopper 17, while FIG. 5 shows stopper means comprising a plurality of cup-shaped stoppers 19 in series.

Figure 7:
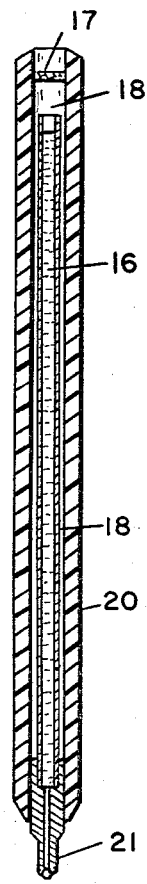
FIGURE 7 is a longitudinal sectional view of a ball pen with a stopper arranged outside the cartridge.

In FIG. 7 there is shown a stopper 17 in the back end portion of a pen 20 holding an ink cartridge 15, the purpose of this illustration being that the stopper means of the invention may be used in the body of the pen itself, as well as in a separate ink reservoir or cartridge. Should the ink 16 flow out from the cartridge the stopper will prevent the ink from leaking out through the back end of the pen. Of course, any of the stopper means exemplified in FIGS. 1–6 may be used in place of the single disc 17 as shown in FIG. 7.

The stoppers 17, 19 may be made from fibrous material such as fibrous paper, felt, wick, filter paper, blotting paper, and the like, wherein spaces between the fibers render the material porous to sufficient extent to permit ingress of atmospheric air into the air space 18 between the stopper and the ink supply. While such material ordinarily possesses absorbent properties so that the pores thereof would become clogged by ink coming in contact with the stopper, this is prevented by treating the material with any suitable substance which renders the stopper pervious to air but impervious to the fluid content of the pen. Such treating material is preferably both hydrophobic and organophobic, since the fluid or ink normally used in ball point pens contains organic solvents and constituents. The hydrophobic quality inhibits the transgress of aqueous moisture.

A preferred treating material is a product known commercially to the trade as "Scotchgard," which is a brand name of the Minnesota Mining and Manufacturing Company covering various fluoro chemicals, and more particularly I prefer to use as an ink repellant an organic chromium complex such as is disclosed, for example, in the following patents:

2,662,835, Reid, Dec. 15, 1953; 2,693,458, Olson, Nov. 2, 1954; 2,909,545, Barnhart, Oct. 20, 1959; and 2,934,450, Brown, Apr. 26, 1960.

The stopper element may be treated by soaking impregnating, coating or otherwise treating the same with the ink repellant substance to prevent the passage of the fluid contents of the pen through the stopper element, while permitting passage of air through such element.

A preferred method of rendering the stopper ink impermeable, particularly where the stopper is formed of paper such as blotting paper, or the like, is to employ the fluid repellant substance, i.e. "Scotchgard," as a sizing solution in the manufacture of the paper, as set forth, for example, in Patent No. 2,934,450 referred to above.

The preferred ink repellant "Scotchgard," which is disclosed in FDA No. 121.2518, as set forth in the Federal Register for December 6, 1962, page 12061, is referred to therein as follows:

"121.2518 Chromium (CR III) complex of N-ethyl-N-heptadecylfluoro-octane sulfonyl glycine."

Other suitable ink repellants may also be used for treating the stopper element or the material from which the element is made within the scope of the invention in its broadest aspects.

Referring again to the material of the stopper which, as already stated, is of a fibrous consistency with pores between the individual fibers, it is also preferred that such material be "hairy" so as to include loosely projecting fiber ends. This is particularly important when using the cup-shaped stopper 19 inasmuch as during the insertion thereof into the cartridge 15 the rim portion 19' of the stopper becomes somewhat creased or wrinkled as indicated at 19" in the largely enlarged view of FIG. 6. These creases or wrinkles produce spaces between the rim portion 19' and the inner wall of the cartridge through which spaces a backflow of ink could take place even if the backflow were prevented by the body of the stopper itself. However, by making the stopper of fibrous material which is "hairy" as described, the loose projecting fiber ends or "hairs" 22 extend into the spaces formed by the wrinkles or creases and backflow of ink through the spaces is thus prevented.

FIGS. 8–11 illustrate the steps of making and inserting the stopper 19 into the reservoir 15 (or pen body 20), the stopper being made from a strip of material 23 which is suitably guided in its passage over a die 24, the die has an aperture 25 to receive a cooperating tubular punch 26, the aperture 25 having a substantially frusto-conical intermediate portion 27 which leads to a restricted passage 28 and the latter, in turn, communicating with a larger aperture or socket 29 in which the open back end portion of the cartridge 15 is received. The tubular punch 26 contains a slidable plunger 30 with a tapered nose portion 30'.

Figure 8:
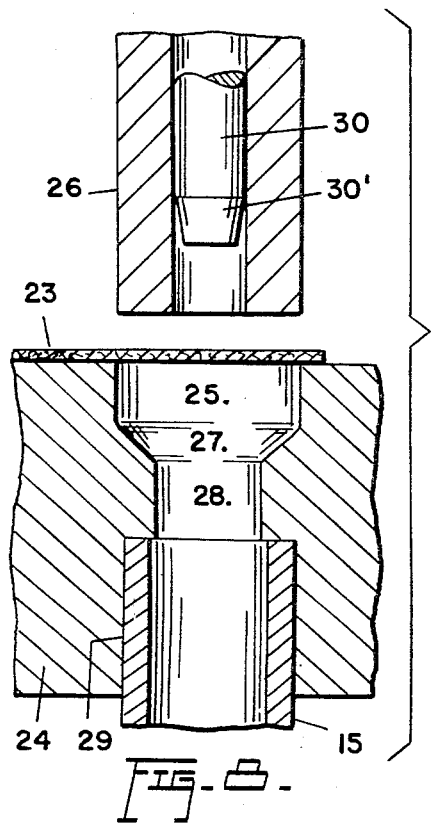
FIGURES 8–11 are fragmentary sectional views showing different steps in the application of a cup-shaped stopper to the ink cartridge.
Figure 9:
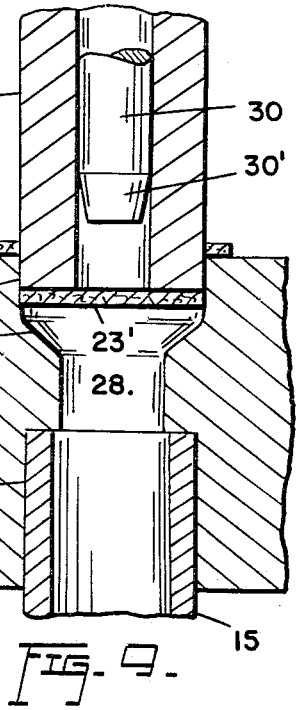
Figure 10:
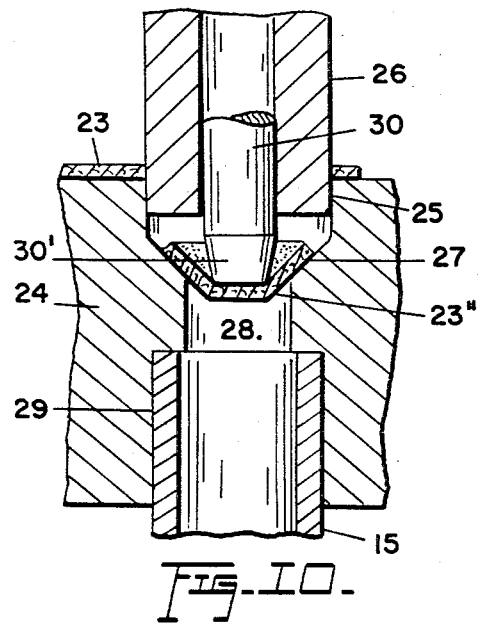
Figure 11:
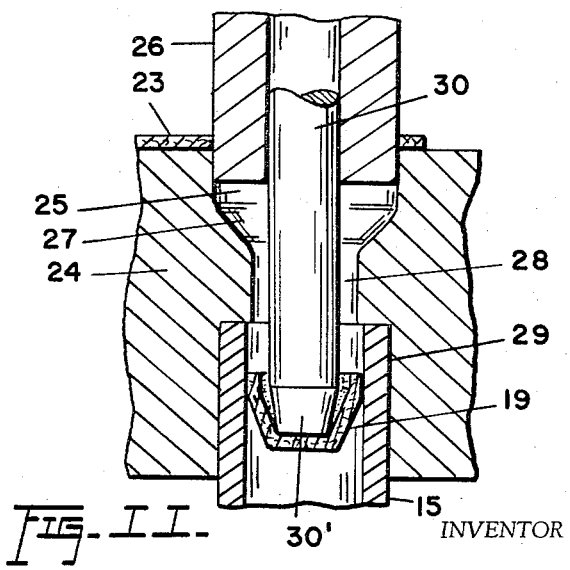

The material strip 23 is fed into position over the aperture 25 of the die 24 as shown in FIG. 8, whereupon the punch 26 is advanced so as to punch a disc 23' out of the material strip and to position the disc 23' in the die aperture 25 as shown in FIG. 9. With the punch 26 remaining in the aperture 25, the plunger 30 is then advanced within the punch so that its nose portion 30' pushes the material disc 23' against the frusto-conical region 27 of the die aperture, thus causing the material disc to become deformed into a frusto-conical shape as at 23" in FIG. 10. Then, as the advancing movement of the plunger 30 continues, the material is forced through the passage 28 into the cartridge 15 in the socket 29 as shown in FIG. 11, and in so doing, the material assumes the cup-shaped form of the stopper 19, as will be readily apparent. The plunger 30 and the punch 26 are then withdrawn from the die and the material strip 23 is advanced for the next cycle of operation. The material of the stopper possesses sufficient inherent elasticity that it remains inside the cartridge 15 by frictional fit after withdrawal of the plunger 30.

Of course, if two or more of the stoppers 19 are to be inserted, as for example in FIG. 5, the stopper forming and inserting operation as above described is repeated, either with the stroke of the plunger being sufficiently long to insert the first stopper as far inward in the cartridge as necessary, whereupon the plunger stroke is progressively decreased for each subsequent stopper so as to produce the series arrangement of stoppers as already described, or with the stroke of the plunger being of constant length, each stopper abuts the previously inserted one pushing it ahead of itself.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. Stopper means for preventing back leak of fluid content in the reservoir of a ball pen, said means comprising a porous stopper member of fibrous material positioned above and separated from the level of said fluid by an air space and adhering frictionally to the wall retaining it; said stopper member including the whole extent of its peripheral zone of contact with the wall retaining it being pervious to air but impervious to both water and organic components of the fluid content, said stopper member being cup-shaped, and being composed of cellulosic material.

2. The combination as set forth in claim 1, wherein said stopper member is impregnated with a chromium complex of a long chain organic fluoro chemical to render it repellant to the fluid content.

3. The combination as set forth in claim 1, wherein said stopper member is composed of hairy fibrous material.

4. Stopper means for preventing back leak of the fluid content in the reservoir of a ball pen, said means comprising a porous stopper member of fibrous material positioned above and separated from the level of said fluid by an air space and adhering frictionally to the wall retaining it; said stopper member including the whole extent of its peripheral zone of contact with the wall retaining it beng pervious to air but impervious to both water and organic components of the fluid content, said stopper member being cup-shaped and being composed of blotting paper treated to render it repellant to the fluid content of the reservoir.

5. The combination as set forth in claim 4, wherein said stopper member is impregnated with a chromium complex of N-ethyl-N-heptadecylfluoro-octane sulfonyl glycine, to render it repellant to the fluid content of the reservoir.

6. The combination of a ballpoint pen reservoir containing ink, and stopper means arranged in fixed position in spaced relation from the ink supply, said stopper means being formed from porous material to permit passage of atmospheric air while preventing backflow therethrough of the content of the reservoir, said stopper means being chemically treated to render the same both hydrophobic and organophobic, said stopper means being cup-shaped and formed from hairy fibrous material, a portion of said stopper means in contact with the wall retaining it being wrinkled with spaces existing between the wrinkled portion and said wall, hairs of said fibrous material projecting loosely into said spaces and preventing back flow of ink therethrough.

7. The stopper as defined in claim 6 wherein said material is treated by a chromium complex of a long chain organic fluoro chemical.

8. In a ballpoint pen having a supply of viscous ink in a reservoir, a sealing device consisting of a sealing member and the walls of a tubular opening retaining it in a frictionally fixed position, said sealing member normally being separated from the contents of the reservoir by an air space, the sealing member being cup-shaped, said cup having side walls of substantial length conforming throughout the whole extent of its periphery to said retaining walls, the cup being made from loosely bound fibrous and porous material having its fibers evenly distributed but randomly oriented, said material prior to its being shaped into a cup having the form of a thin disc cut out from a flat strip, all of the material providing said side walls of substantial length conforming to the retaining walls originating from one of the flat structurally undisrupted faces of said disc, the material of said sealing member being treated with a substance allowing the passage of air but repelling the contents of the reservoir to make the small pores of the device including any small passages and creases between the outer side walls of the cup and the walls retaining it impermeable, said pores and creases constituting the only means of communication for air between said air space and the atmosphere.

References Cited

UNITED STATES PATENTS

| | | | |
|---|---|---|---|
| 2,672,127 | 3/1954 | Fehling | 120—42.4 |
| 2,730,933 | 1/1956 | Boyle | 120—42.4 |
| 2,979,030 | 4/1961 | Harrington | 120—42.4 |
| 3,008,453 | 11/1961 | Kahn et al. | 120—42.4 |
| 3,030,925 | 4/1962 | Dyson | 120—42.4 |
| 3,056,194 | 10/1962 | Kahn et al. | 120—42.4 |

FOREIGN PATENTS

| | | |
|---|---|---|
| 129,205 | 11/1964 | Australia. |
| 570,999 | 9/1958 | Belgium. |
| 815,212 | 6/1959 | Great Britain. |
| 806,331 | 6/1951 | Germany. |

LAWRENCE CHARLES, *Primary Examiner.*